United States Patent
Spahis et al.

(10) Patent No.: US 11,825,024 B1
(45) Date of Patent: Nov. 21, 2023

(54) MANAGING OUTBOUND CALLING

(71) Applicant: Capital One Services, LLC, McLean, VA (US)

(72) Inventors: Christopher Spahis, Plano, TX (US); Hao Liu, Allen, TX (US); Sangame Krishnamani, Plano, TX (US); Shiju Madathil Samuel, Frisco, TX (US); Krista Rister, McKinney, TX (US); Sunilkumar Kothi Reddy, Little Elm, TX (US); Ryan Hennigan, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/813,126

(22) Filed: Jul. 18, 2022

(51) Int. Cl.
*H04M 3/523* (2006.01)

(52) U.S. Cl.
CPC ................... *H04M 3/5236* (2013.01)

(58) Field of Classification Search
None
See application file for complete search history.

(56) References Cited

U.S. PATENT DOCUMENTS

| | | | | |
|---|---|---|---|---|
| 2009/0175432 A1* | 7/2009 | Whitehead | ......... | H04M 1/2746 379/216.01 |
| 2009/0270087 A1* | 10/2009 | Yamakita | ............... | H04M 3/46 455/445 |
| 2011/0194679 A1* | 8/2011 | Patisaul | ............... | H04M 15/28 379/142.04 |
| 2017/0230503 A1* | 8/2017 | Stumpf | .............. | H04M 3/5158 |

* cited by examiner

Primary Examiner — Hemant S Patel
(74) Attorney, Agent, or Firm — Harrity & Harrity, LLP

(57) ABSTRACT

In some implementations, a system may identify, based on an account status of an account, one or more phone numbers associated with the account. The system may determine a confidence score of each phone number, based on historical call data and one or more phone number attributes, a rank of the phone number(s) based on corresponding confidence scores, and a quality score for each phone number based on a relative comparison of confidence scores of phone numbers of at least a subset of a plurality of users. The system may determine a daily call schedule, which may include a total frequency to call the user, based on the account status, a phone number frequency to call each phone number, based on one or more conditions related to corresponding quality scores, and a call order in which to call each phone number, based on the rank of the phone number(s).

20 Claims, 6 Drawing Sheets

MANAGING OUTBOUND CALLING

BACKGROUND

An outbound call is one initiated by a call center agent to an existing or a prospective customer on behalf of a call center or client. Outbound calls may be made to recipients for such purposes as sales, lead generation, telemarketing, fundraising, or debt collection.

SUMMARY

Some implementations described herein relate to a system for managing outbound calling. The system may include one or more memories and one or more processors communicatively coupled to the one or more memories. The one or more processors may be configured to identify an account status of an account of a user of a plurality of users. The one or more processors may be configured to identify, based on the account status, one or more phone numbers associated with the account and stored in a database. The one or more processors may be configured to determine a confidence score of each phone number, of the one or more phone numbers, based on historical call data and one or more phone number attributes for each phone number. The one or more processors may be configured to determine a rank of the one or more phone numbers associated with the account based on the confidence score of each phone number. The one or more processors may be configured to determine a quality score for each phone number, of the one or more phone numbers, based on a relative comparison of confidence scores of a plurality of phone numbers of at least a subset of users, of the plurality of users, stored in the database. The one or more processors may be configured to determine a daily call schedule by which to call the user, wherein the daily call schedule includes a total frequency to call the user, a phone number frequency to call each phone number of the one or more phone numbers, and a call order in which to call each phone number of the one or more phone numbers.

Some implementations described herein relate to a method of managing outbound calling. The method may include receiving, by a system, account data indicating one or more account phone numbers associated with an account of a user. The method may include storing, by the system and in a database, call data associated with each account phone number of the one or more account phone numbers. The method may include determining, by the system, a priority of the one or more account phone numbers based on a machine learning model, wherein the machine learning model is trained using the call data. The method may include determining, by the system, one or more selected phone numbers, of the one or more account phone numbers, to be called based on a relative comparison of the one or more account phone numbers, arranged in a ranked order based on the priority, with another one of the one or more account phone numbers. The method may include determining, by the system, a call schedule by which to call each selected phone number, of the one or more account phone numbers, wherein the call schedule includes a frequency to call each selected phone number. The method may include transmitting, by the system and to an outgoing call system, call schedule data indicating the call schedule.

Some implementations described herein relate to a non-transitory computer-readable medium that stores a set of instructions for managing outbound calling for a device. The set of instructions, when executed by one or more processors of the device, may cause the device to identify one or more account phone numbers associated with an account of a user, of a plurality of users, stored in a database. The set of instructions, when executed by one or more processors of the device, may cause the device to determine a confidence score of each account phone number, of the one or more account phone numbers, based on historical call data and one or more phone number attributes for each account phone number. The set of instructions, when executed by one or more processors of the device, may cause the device to determine a ranked order of the one or more account phone numbers based on the confidence score of each account phone number. The set of instructions, when executed by one or more processors of the device, may cause the device to determine one or more selected phone numbers, of the one or more account phone numbers, to be called based on a relative comparison of the one or more account phone numbers, arranged in the ranked order, with another one of the one or more account phone numbers. The set of instructions, when executed by one or more processors of the device, may cause the device to determine a daily call schedule by which to call the user, wherein the daily call schedule includes a total frequency to call the user, a phone number frequency to call each selected phone number of the one or more selected phone numbers, and a call order in which to call each selected phone number of the one or more selected phone numbers.

DETAILED DESCRIPTION

Figure 1A:
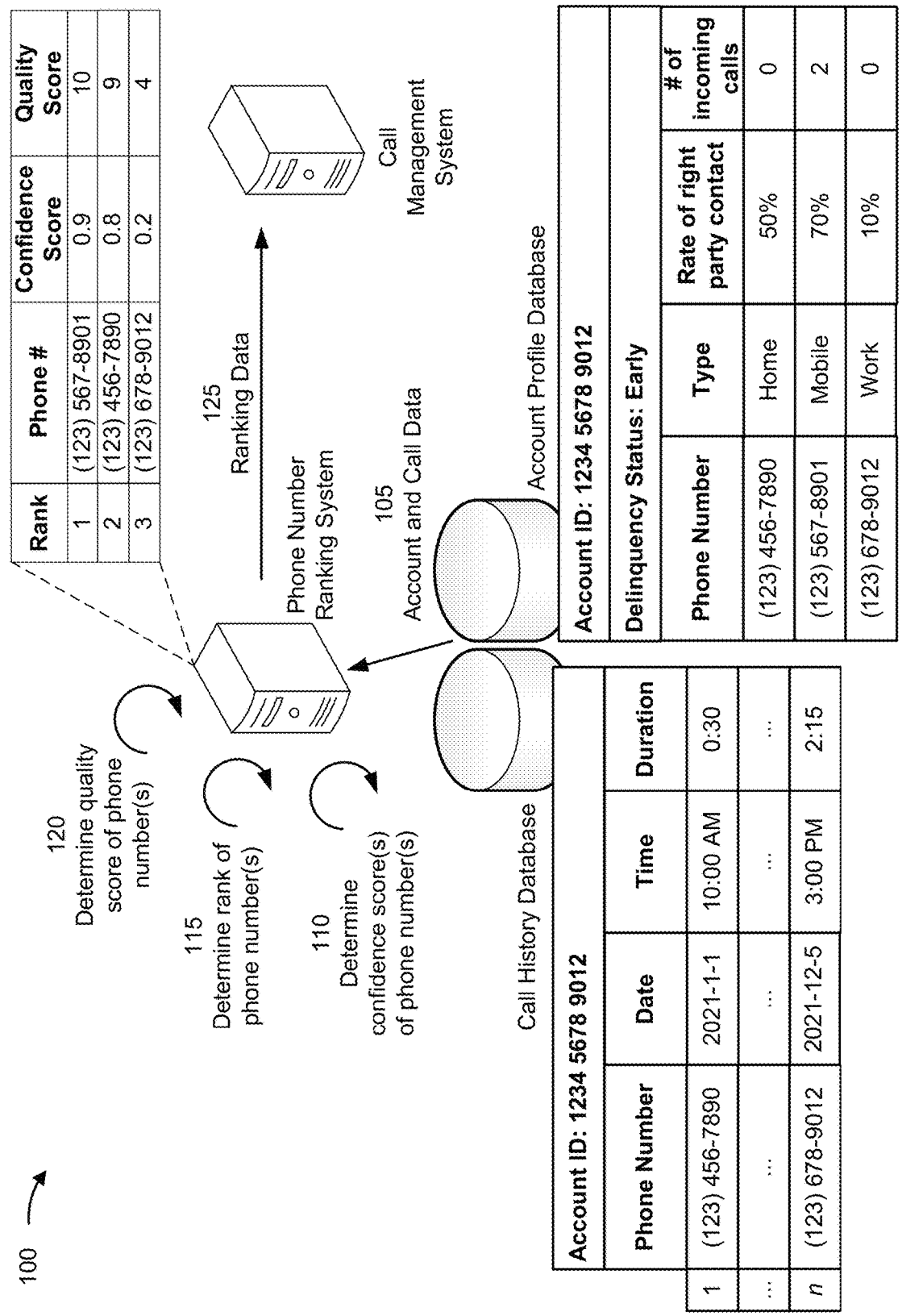
FIGS. 1A-1C are diagrams of an example implementation relating to managing outbound calling, in accordance with some embodiments of the present disclosure.

The following detailed description of example implementations refers to the accompanying drawings. The same reference numbers in different drawings may identify the same or similar elements.

Users having an account with an institution may have one or more phone numbers associated with the account. In some scenarios, the institution may need or desire to contact a particular user, for example, if the user is delinquent with respect to a balance associated with the user's account. Call agents of the institution may contact the user at one or more of the phone numbers associated with the user's account. However, one or more of the phone numbers may not be accurate or reliable (e.g., if the user changes phone numbers but does not update the account and/or if a particular one of the phone numbers is less frequently used or checked by the user). Additionally, the call agents may have to make manual determinations and investigations into the different phone numbers to determine which ones to attempt and in what order. As a result, attempts by the institution to contact the particular user may vary greatly in success. Thus, the institution may expend more resources (e.g., computing resources, time, and/or money) attempting to contact the user in an inefficient manner than if the institution had a high level of certainty with respect to the phone numbers associated with the user's account. Accordingly, it is desirable to have a system that employs a strategic plan to efficiently contact a user with respect to the phone numbers associated with the user's account.

Some implementations described herein provide a system that determines a confidence in the phone numbers associated with a user account, and a schedule with which to call the phone numbers based on the confidence in the phone numbers. To do so, the system may determine a confidence score of each phone number associated with the user account. The confidence score may be based on historical call data and/or one or more phone number attributes (e.g., type of phone number or type of user) associated with the particular phone number. Based on the confidence scores of the phone numbers, the system may rank the phone numbers (e.g., in order of decreasing confidence score). Based on the rank of the phone numbers and one or more conditions related to a relative comparison of the phone numbers, the system may determine which of the phone numbers to call (e.g., selected phone numbers) and a daily call schedule with which to call the selected phone numbers. The call schedule may include a total frequency to call the user, a phone number frequency to call each of the selected phone numbers, and a call order in which to call the selected phone numbers.

In some implementations described herein, the system may determine quality scores for each of the phone numbers associated with the user account. The quality scores may be based on a relative comparison of confidence scores of phone numbers of multiple users (including the user associated with the user account). For example, the phone numbers may be ranked in descending order of confidence scores, and then divided into groups representing different percentiles of the confidence scores. The quality score for a particular phone number may be based on the group in which the particular phone number falls. The one or more conditions used to determine the selected phone numbers and the daily call schedule may be based on a relative comparison of the quality scores of the phone numbers associated with the user account.

Based on the ranking/scoring of the phone number(s) and the daily call schedule, the system may strategically attempt to call the user, resulting in a higher success rate of contacting the user. By utilizing the ranking/scoring may identify and select only the accounts requiring calls (e.g., accounts having a certain delinquency status), identifying the phone numbers associated with the account that have the highest probability for successful contact, and may determine a call schedule (e.g., which phone numbers to call, when to call each phone number, and order in which to call each phone number) and a call order (e.g., which accounts to prioritize). Accordingly, system time and computing resources may be efficiently used to manage outgoing calling to multiple users on a daily basis. Additionally, the system may reduce or remove manual determinations by the call agents, thereby further increasing accuracy and efficiency of the system, increasing efficiency and productivity of the call agents, and allowing for more outgoing calls to be made and accounts (e.g., delinquent accounts) to be addressed and/or settled. This further reduces any inefficiencies due to learning curves and/or time and resources expended for training new call agents.

Figure 1B:
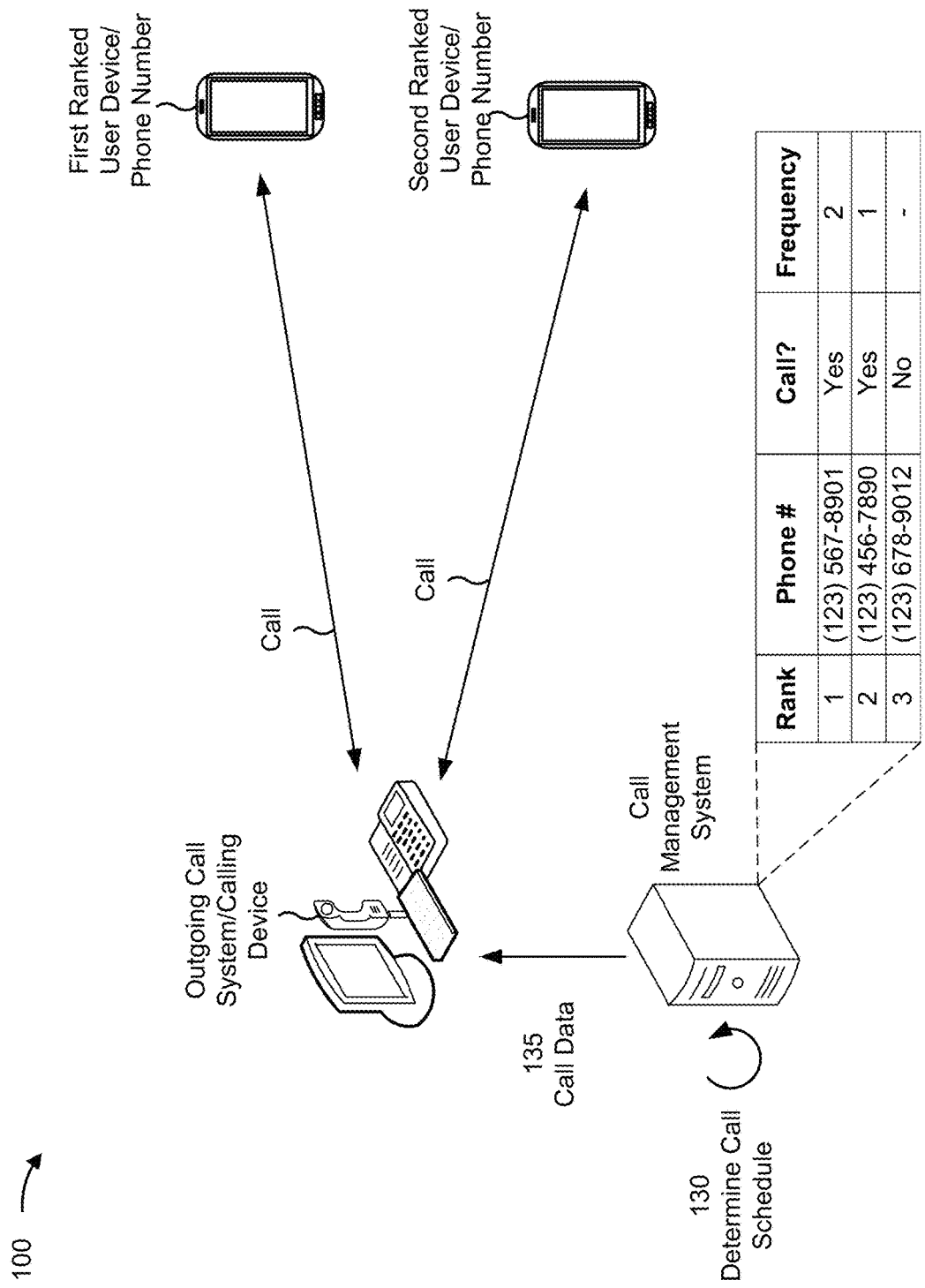
Figure 1C:
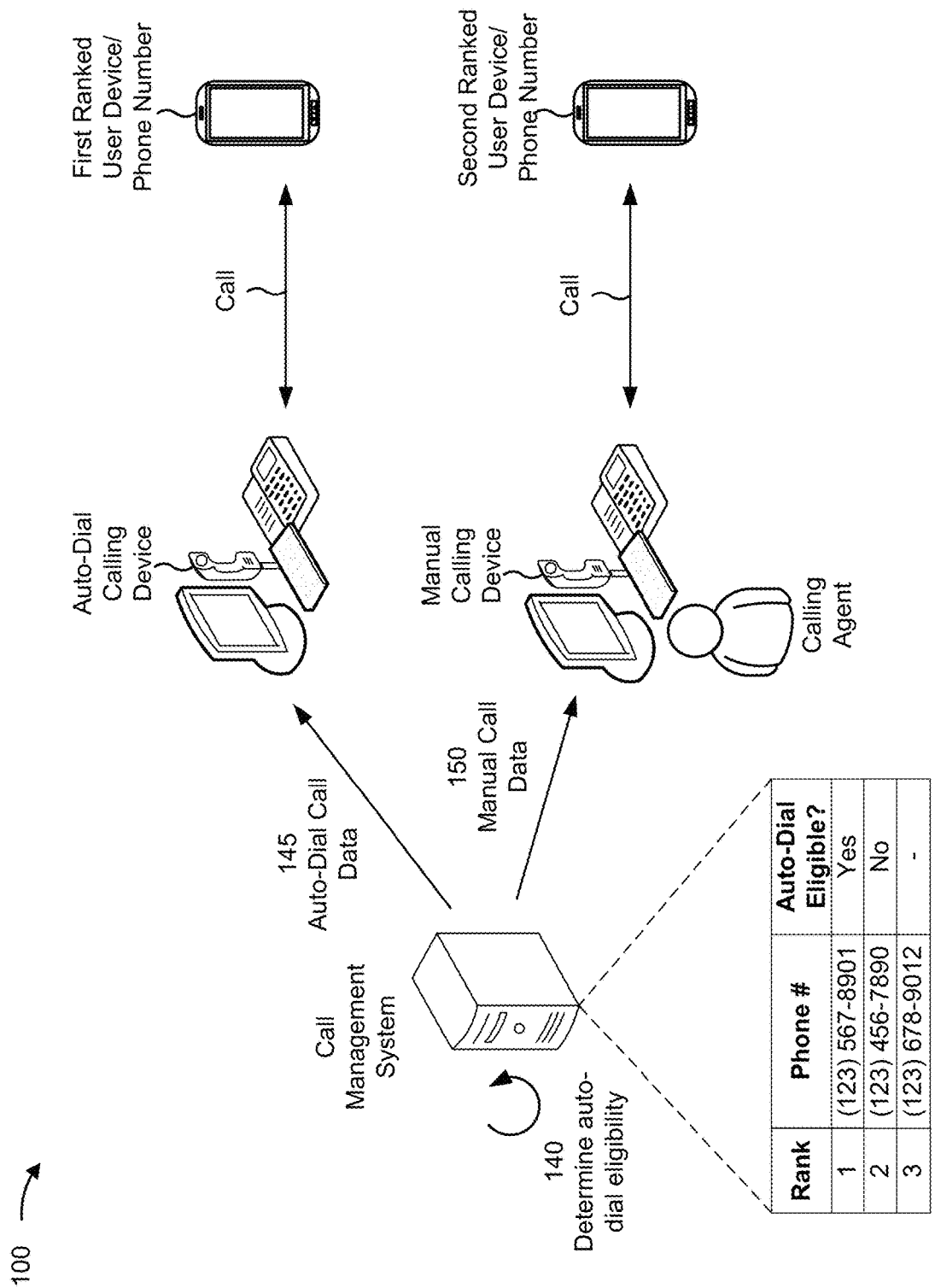

FIGS. 1A-1C are diagrams of an example 100 associated with managing outbound calling. As shown in FIGS. 1A-1C, example 100 includes a phone number ranking system, a call management system, an account profile database, a call history database, an outgoing call system, a calling device, and a user device. These devices are described in more detail in connection with FIGS. 2 and 3.

As shown in FIG. 1A, an account of a user (e.g., a user account) may have one or more phone numbers (also referred to as account phone numbers) associated with the user account. A system, which may be or may include the phone number ranking system and/or the call management system, may receive account data associated with the user account, for example, when the user signs up for the user account, and the system may store the account data in the account profile database. The account data may indicate account information, including the phone number(s) associated with the user account and user information associated with the user (e.g., the user's name and address). Each phone number may be associated with a phone number type (e.g., a home phone number type, a mobile phone number type, or a work phone number type). The account information also may include a status (e.g., a delinquency status) associated with the user account.

The system also may store, in the account profile database and/or the call history database, call data (or historical call data) associated with each phone number associated with the user account. For example, the call data may indicate the date, time, and/or duration of each call with each phone number. Additionally, the call data may indicate a quantity of connected calls with the user and/or a particular phone number, such as a quantity of outgoing calls (e.g., calls made to the particular phone number) and/or a quantity of incoming calls (e.g., calls received from the particular phone number). Additionally, or alternatively, for each connected call, the call data may indicate a call duration of the particular connected call, a time at which the particular connected call occurred, and/or a date on which the particular connected call occurred.

As shown by reference number 105, the phone number ranking system may obtain, from the account profile database, account data, indicating the account information (e.g., the phone number(s), the phone number type(s) associated with the phone number(s), and/or the account status) and/or the call data associated with the phone number(s). Based on receiving the account data and/or the call data, the phone number ranking system may determine a priority of the phone number(s) associated with the user account. For example, as shown by reference number 110, the phone number ranking system may determine a confidence score for each phone number, which may be determined and assigned from a scale of confidence values (e.g., 0-1, 0-10, or 0-100). The phone number ranking system may determine the confidence score based on historical call data associated with the particular phone number (e.g., the quantity of connected calls with the particular phone number and/or the duration of each connected call) and/or one or more phone number attributes associated with the particular phone number (e.g., the phone number type of the particular phone number or a user type, such as whether the particular phone number is associated with a primary account holder or a secondary account holder).

For example, the phone number ranking system may determine the confidence score based on a rate at which the right party was contacted at a particular phone number (e.g., rate of right party contact). For example, a phone number with a rate of right party contact falling within a particular range may have an associated confidence score for a particular phone number. As examples, rates of right party contact falling within a first range (e.g., 0-33%) may result in a low confidence score (e.g., 0.1, 0.2, or 0.3). Rates of right party contact falling within a second range (e.g., 34%-67%) may result in a medium confidence score (e.g., 0.4, 0.5, or 0.6). Rates of right party contact falling within a third range (e.g., 68%-100%) may result in a high confidence score (e.g., 0.7, 0.8, or 0.9). In some implementations, the phone number ranking system may use data within a time threshold (e.g., 1 month, 3 months, or 6 months) from a current date. Additionally, the date of the particular data used may further define the confidence score. For example, for a rate of right party contact that falls within the third range for calls that occurred within the past month, the confidence score may be high (e.g., 0.9). For a rate of right party contact that falls within the third range but is for calls that occurred within the past 3 months, the confidence score may be lower (e.g., 0.8).

Additionally, or alternatively, the phone number ranking system may determine a confidence score for the particular phone number proportionally based on the quantity of connected calls. As examples, one connected call may result in a confidence score of 0.1, two connected calls, may result in a confidence score of 0.2, three connected calls may result in a confidence score of 0.3, etc. Alternatively, the phone number ranking system may determine the confidence score depending upon a range of values within which the quantity of connected calls associated with the particular phone number falls. For example, if the quantity of connected calls falls within a first (low) range (e.g., 0-3), then the confidence score may be a low confidence value (e.g., 0.1, 0.2, or 0.3). If the quantity of connected calls falls within a second (medium) range (e.g., 4-7), then the confidence score may be a medium confidence value (e.g., 0.4, 0.5, or 0.6). If the quantity of connected calls falls within a third (high) range (e.g., 8 or greater), then the confidence score may be a high confidence value (e.g., 0.7, 0.8, or 0.9).

Additionally, or alternatively, the phone number ranking system may determine the confidence score based on a number of days since an inbound call from the particular phone numbers. For example, a particular number of days may correspond to a particular confidence score. As an example, a particular phone number for which an inbound call was received within 0 days may have a confidence score of 0.9. A particular phone number for which an inbound call was received within 1 day may have a confidence score of 0.8. Alternatively, a particular range of days may correspond to a particular confidence score. For example, a particular phone number for which an inbound call was received within a week (e.g., 7 days) may have a high confidence score (e.g., 0.9). A particular phone number for which an inbound call was received in over a year may have a low confidence score (e.g., 0.1).

Additionally, or alternatively, the phone number ranking system may determine the confidence score based on a number of outgoing calls to the particular phone numbers. For example, a phone number associated with a number of outgoing calls falling within a particular range may have an associated confidence score. As examples, a number of outgoing calls falling within a first range (e.g., 0-2 outgoing calls) may result in a low confidence score (e.g., 0.1, 0.2, or 0.3), within a second range (e.g., 3-5 outgoing calls) may result in a medium confidence score (e.g., 0.4, 0.5, or 0.6), or within a third range (e.g., more than 5 outgoing calls) may result in a high confidence score (e.g., 0.7, 0.8, or 0.9). In some implementations, the phone number ranking system may use data within a time threshold (e.g., 1 month, 3 months, or 6 months) from a current date. Additionally, the date of the particular data used may further define the confidence score. For example, for a number of outgoing calls falling within the third range for calls that occurred within the past month, the confidence score may be high (e.g., 0.9). For a number of outgoing calls falling within the third range but that occurred within the past 3 months, the confidence score may be lower (e.g., 0.8). Additionally, the confidence score may be based on whether or not the outgoing calls resulted in actual right party contact on the same day that the outgoing calls are placed.

Additionally, or alternatively, the phone number ranking system may determine the confidence score based on a number of messages (e.g., voicemails) left with the particular phone numbers. For example, if the number of voicemails left with a particular phone number falls within a first range (e.g., greater than 10 voicemails), then the confidence score may be low (e.g., 0.1, 0.2, or 0.3). If the number of voicemails left falls within a second range (e.g., 5-10 voicemails), then the confidence score may be a medium value (e.g., 0.4, 0.5, or 0.6). If the number of voicemails left falls within a third range (e.g., less than 5 voicemails), then the confidence score may be a high value (e.g., 0.7, 0.8, or 0.9). In some implementations, the phone number ranking system may use data within a time threshold (e.g., 1 month, 3 months, or 6 months) from a current date. Additionally, the date of the particular data used may further define the confidence score. For example, for a number of voicemails falling within the third range that were left within the past month, the confidence score may be high (e.g., 0.9). For a number of voicemails calls falling within the third range that were left within the past 3 months, the confidence score may be lower (e.g., 0.8).

Additionally, or alternatively, the phone number ranking system may determine the confidence score based on the duration of the connected calls. For example, if a particular phone number has a quantity of connected calls that have a call duration that exceeds a duration threshold (e.g., 1 minute), and the quantity of connected calls exceeds a quantity threshold (e.g., three), then the confidence score for the particular phone number may have a high confidence score (e.g., above 0.5). Additionally, or alternatively, the phone number ranking system may use the average duration of the connected calls for each phone number (e.g., in connection with the quantity of connected calls) to determine the confidence score. For example, if a particular phone number has a high quantity of connected calls (e.g., 8 or greater), but the average duration is for a low duration (e.g., less than 30 seconds), then the confidence score may have a confidence value (e.g., 0.7) that is lower than a confidence value (e.g., 0.9) if the average duration is for a high duration (e.g., over a minute). As another example, if a particular phone number has a low quantity of connected calls (e.g., in a range from 0-3), but the average duration is for a high duration (e.g., over a minute), then the confidence score may have a confidence value (e.g., 0.3) that is higher than a confidence value (e.g., 0.1) if the average duration is for a low duration (e.g., less than 30 seconds).

Additionally, or alternatively, the phone number ranking system may determine a confidence score based on the phone number type (e.g., home phone number type, mobile phone number type, or work phone number type). For example, a phone number associated with a home phone number type may have a confidence score with a high confidence value (e.g., 0.7, 0.8, or 0.9). A phone number associated with a mobile phone number type may have a confidence score with a medium confidence value (e.g., 0.4, 0.5, or 0.6). A phone number associated with a work phone number type may have a confidence score with a low confidence value (e.g., 0.1, 0.2, or 0.3).

Additionally, or alternatively, the phone number ranking system may determine a confidence score based on the user type of the user (e.g., whether the user associated with the particular phone number is a primary account holder or a secondary account holder). For example, a phone number associated with a primary account holder may have a confidence score with a high confidence value (e.g., 0.6, 0.7, 0.8, or 0.9) and/or a phone number associated with a secondary account holder may have a confidence score with a low confidence value (e.g., 0.1, 0.2, 0.3, 0.4, or 0.5).

In implementations in which multiple variables (e.g., the phone historical call data and/or the phone number attributes) are considered to determine the confidence score, the phone number ranking system may apply a weight to the value determined for the particular variable (e.g., the importance of the variables may be ranked). For example, the rate of right party contact may have the greatest weight (e.g., be ranked highest), the phone number type may have the second greatest weight, and the user designation (e.g., primary account holder or secondary account holder) may have the lowest weight. As an example, a phone number having a high rate of right party contact associated with a high confidence value and a phone number type associated with a low confidence value may have a higher confidence score than a phone number having a low rate of right party contact associated with a low confidence value and a phone number type associated with a high confidence value.

As shown by reference number 115, the phone number ranking system may determine a rank or ranked order of the one or more phone numbers based on the priority and/or the confidence score of each phone number. For example, the phone numbers may be ranked in order of decreasing confidence score (e.g., the phone number with the highest confidence score will be ranked first).

In some implementations, the phone number ranking system may use a machine learning model to determine the priority of the phone number(s) (e.g., to obtain the confidence score(s) for the phone number(s)). For example, the machine learning model may be a supervised machine learning model trained based on the historical call data and/or the phone number attributes associated with the particular phone number.

Based on the priority of the phone number(s) associated with the user account, the phone number ranking system may determine one or more selected phone numbers, of the phone number(s), that should be selected to be called. In some implementations, the selected phone numbers may be determined based on the respective confidence scores. For example, if the confidence score of a particular phone number (e.g., a first ranked phone number) exceeds a confidence score threshold, then the particular phone number may be determined to be a selected phone number. Additionally, or alternatively, the phone number ranking system may determine the selected phone number(s) based on a relative comparison of the phone number(s), arranged in the ranked order as described above, with one or more of the other phone numbers associated with the user account.

For example, as shown by reference number 120, the phone number ranking system may determine a respective quality score for each phone number. The quality score may be based on a relative comparison of confidence scores of user phone numbers of all the users stored in the account profile database or of a subset of all of the users (e.g., users having a similar account status), including the account phone number(s) of the user. For example, the user phone numbers may be arranged in an overall order of decreasing confidence score, and then may be divided into equal groups (e.g., 10 groups). Each group may represent a percentile of the user phone numbers in the particular group, and each group may be assigned a group number corresponding to the percentile (e.g., based on the confidence scores of the user phone numbers in the particular group). For example, the group having the user phone numbers associated with the highest confidence scores may be assigned a group number of 10, and the group having the user phone numbers with the lowest confidence scores may be assigned a group number of 1. The quality score of each user phone number may be based on the percentile in which the particular user phone number is grouped (e.g., the quality score may correspond to the group number of the group in which the particular user phone number falls). For example, the quality score of a user phone number in the group having a group number of 10 will be 10, the quality score of a user phone number in the group having a group number of 9 will be 9, etc.

As shown by reference number 125, the phone number ranking system may transmit, and the call management system may receive, ranking data indicating the ranking of the phone number(s) associated with the user account. The phone number ranking system may also transmit, to the call management system, phone number score data, indicating the confidence scores and/or the quality scores of the phone number(s), and/or account data (e.g., the account status).

As shown in FIG. 1B and by reference number 130, the call management system may determine a call schedule for each day (e.g., a daily call schedule). The daily call schedule may include a total frequency (e.g., number of times) to call the user, a phone number frequency (e.g., a number of times) to call each phone number, and/or a call order in which to call each phone number. The total frequency may be based on the account status. For example, if the account has a first account status (e.g., an early delinquency status), then the total frequency may be a first number (e.g., one). If the account has a second account status (e.g., an intermediate delinquency status), then the total frequency may be a second number (e.g., two attempts) that is different (e.g., greater than) the first number. If the account has a third account status (e.g., a late delinquency status), then the total frequency may be a third number (e.g., three) that is different (e.g., greater than) the first number and the second number.

The phone number frequency may be based on one or more conditions related to the quality score for each phone number (e.g., a comparison of the quality score with one or more of the other phone numbers associated with the user account) and the total frequency. For example, if a user account has one phone number associated with the account, then the condition may be that if the quality score for the one phone number is at or above a threshold value (also referred to as a quality score threshold) (e.g., 5), then the phone number frequency will be equal to the total frequency. If the quality score is below the quality score threshold, then the phone number frequency will be zero (e.g., the phone number will not be called), and a new phone number to associate with the user account and to call may need to be obtained, as described in more detail below.

As another example, if a user account has three phone numbers associated with the user account, then the phone number ranked first (e.g., the first ranked phone number) may be added to a call list (e.g., a list of phone numbers to call) if the quality score of the first ranked phone number is greater than a quality score threshold (e.g., 5). To determine if the phone number ranked second (e.g., the second ranked phone number) and the phone number ranked third (e.g., the third ranked phone number) satisfy conditions to be added to the call list (e.g., qualify for being added to the call list), the quality score of the second ranked phone number may be compared with the quality score of the first ranked phone number, and the quality score of the third ranked phone number may be compared with the quality score of the first ranked phone number and/or the quality score of the second ranked phone number. In such an example, one example of a condition may be that if the quality score of the second ranked phone number is within a first threshold number (e.g., 2 quality scores) from the quality score of the first ranked phone, then the second ranked phone number qualifies to be added to the call list. Additionally, or alternatively, if the quality score of the third ranked phone number is within a second threshold number (e.g., 4 quality scores) from the quality score of the first ranked phone number, then the third ranked phone number qualifies to be added to the call list. Alternatively, if the quality score of the third ranked phone number is outside of the second threshold number, then the third number will not be added to the call list, and the call order may be the first ranked phone number, then the second ranked phone number, and then back to the first ranked phone number.

If the number of phone numbers qualifying to be added to the call list (e.g., qualifying phone numbers) exceeds the total frequency (e.g., the total number of calls to place to the user), then the phone number or phone numbers having a rank that exceeds the total frequency will not be added to the call list. For example, if the total frequency is one call (e.g., because the user has an early delinquency status), then the second ranked phone number and the third ranked phone number will not be added to the call list (in other words, only the first ranked phone number will be called). In such a scenario, the phone number frequency for the first ranked phone number will be equal to the total frequency (e.g., one).

If the number of qualifying phone numbers is the same as or less than the total frequency, then each of the qualifying phone numbers will be added to the call list. In a scenario in which the number of qualifying phone numbers is the same as the total frequency, then each phone number will have a phone number frequency of one. In a scenario in which the number of qualifying phone numbers is less than the total frequency, then the number of calls exceeding the number of qualifying numbers may be distributed to the phone numbers in order of rank. For example, if the total frequency is three (e.g., the user has a late delinquency status), and only the first ranked phone number and the second ranked phone number are added to the call list, then the first ranked phone number may have a phone number frequency of two, and the second ranked phone number may have a phone number frequency of one.

The call order may be based on the rank of the one or more phone numbers and/or the conditions used to determine the phone number frequency. For example, in the scenario in which the first ranked phone number, the second ranked phone number, and the third ranked phone number are added to the call list, the order in which the phone numbers will be called may be based on the rank (e.g., the first ranked phone number first, the second ranked phone number second, and the third ranked phone number third). As another example, in a scenario in which only the first ranked phone number and the second ranked phone number are added to the call list, the call order may depend upon one or more conditions related to the quality scores of the first ranked phone number and the second ranked phone number. For example, in a scenario in which the total frequency is three calls, if the quality score of the second ranked phone number is within a first threshold number (e.g., two) from the quality score of the first ranked phone number, then the call order may be the first ranked phone number first, the second ranked phone number second, and the first ranked phone number third. If the quality score of the second ranked phone number is outside of the first threshold number but within a second threshold number (e.g., four), then the call order may be the first ranked phone number first and second, and the second ranked phone number third.

Additionally, or alternatively, the call order may be determined based on the particular day and/or time of day each call is to be made. For example, if the first ranked phone number has a home phone number type and the second ranked phone number has a work phone number type, and the first phone call in the call order is scheduled at a time of day in which the user is not at home (e.g., is at work) and the last call is scheduled at a time of day in which the user is at home (e.g., after work hours), then the call order may be the second ranked phone number first and the first ranked phone number last. As another example, if the first ranked phone number is a work phone number, and the calls are scheduled to be made when the user is not going to be at work (e.g., on a holiday or a weekend), then all the calls made be made to the second ranked phone number and/or the third ranked phone number (depending on whether the second ranked phone number and/or third ranked phone number satisfy one or more conditions related to the phone number frequency as described above).

As shown by reference number 135, the call management system may transmit call data to an outgoing call system. The call data may indicate the call schedule (e.g., call frequency and/or call order). Additionally, the call data may indicate a particular phone number for the outgoing call system (e.g., a call agent) to call at the time that the call data is received or within a time threshold (e.g., 1 minute or 5 minutes) from the time that the call data is received. The outgoing call system may be or may include a calling device with which the call(s) are to be made. Additionally, or alternatively, the outgoing call system may be part of a same system as the phone number ranking system and/or the call management system, or the outgoing call system may be part of a third party calling system. The outgoing call system may place one or more outgoing calls to the user devices corresponding to the phone numbers in the call order (e.g., a first ranked user device corresponding to the first ranked phone number, a second ranked user device corresponding to the second ranked phone number, and/or a third ranked user device corresponding to the third ranked phone number). As shown in FIG. 1B, the outgoing call system may place the calls according to the call data received from the call management system.

In some implementations, as shown in FIG. 1C, one or more phone numbers may be auto-dial eligible (e.g., the particular phone number may be called by an auto-dial calling device, of an auto-dial system, as opposed to a live person). As shown by reference number 140, the call management system may determine auto-dial eligibility for each phone number (e.g., if the particular phone number satisfies an auto-dial eligibility condition). For example, one auto-dial eligibility condition may be that the user has given consent (e.g., Telephone Consumer Protection Act (TCPA) consent) for a particular phone number associated with the user account to be auto-dialed.

The call management system may factor the auto-dial eligibility of one or more phone numbers in determining the call order and/or phone number frequency. For example, if a first ranked phone number is not auto-dial eligible and a second ranked phone number is auto-dial eligible, the call management system may compare the quality scores of the first ranked phone number and the second ranked phone number. If the quality score of the first ranked phone number is greater than the quality score of the second ranked phone number by a threshold amount, then the call management system may set the first ranked phone number first in the call order. If the quality score of the first ranked phone number is greater than the quality score of the second ranked phone number by an amount that is less than the threshold amount, then the call management system may set the second ranked phone number first in the call order.

After the call management system has determined the call schedule, including which phone numbers are to be auto-dialed and which phone numbers are to be manually dialed, the call management system may transmit call schedule data indicating the call schedule to the auto-dial system, as shown by reference number 145, and/or to a manual calling system (e.g., a system, including a calling device, of a live calling agent), as shown by reference number 150. The call data may be the same to both systems (e.g., a call schedule), or the call data may be dedicated for each device/system. For example, the call data transmitted to the auto-dial system may indicate an auto-dial call schedule related to only the auto-dial eligible phone number(s). Additionally, or alternatively, the call data transmitted to the manual calling device/system may indicate a manual call schedule related to only the non-auto-dial eligible phone number(s) Alternatively, the call data may indicate a particular phone number for the outgoing call system (e.g., a call agent) to call at the time that the call data is received or within a time threshold (e.g., 1 minute or 5 minutes) from the time that the call data is received.

In some scenarios, none of the phone numbers associated with the user account may have a confidence score and/or a quality score that meets a condition to be included in a call list and call order (e.g., the confidence score and/or the quality score are below a threshold value), as explained above. In such a scenario, the phone number ranking system and/or the call management system may be configured to obtain at least one external phone number, from a third party server, that is associated with the user. For example, the phone number ranking system and/or the call management system may perform a search of the third party server using the user's information (e.g., the user's name and/or address) stored in the account profile database.

In some implementations, the call management system may determine which users to attempt to call over other users (e.g., priority of users) based on one or more factors. For example, a particular user may have a preferred time or timeframe during which to be contacted (as may be stored in the account profile database). The call management system may prioritize other users to call when outside of that preferred time or timeframe. Additionally, or alternatively, the account for a particular user may have the user's geographic location (e.g., via the user's address or area code of the phone numbers associated with the user's account), and as a result, may be able to determine the time zone in which the user is. Additionally, or alternatively, the time zone associated with the user's account may be stored in the account profile database. If the current time falls outside of an acceptable time calling range (e.g., beyond 8:00 PM in the time zone associated with the user account), then the call management system may prioritize other users to call without a similar time constraint.

As explained above, a ranking system (e.g., the phone number ranking system) may be employed to rank one or more phone numbers associated with an account (e.g., by determining a confidence and/or a quality score for each phone number). Based on the ranking/scoring of the phone number(s), a calling system (e.g., the call management system) may determine a call schedule (e.g., phone number frequency and/or call order) via which to call each phone number. The call schedule may be determined based on a call strategy related to one or more conditions. Based on the call strategy, the rate at which a connection is made with a user (e.g., via a user calling device) may be increased, and system time and computing resources may be efficiently used to perform the outgoing calling.

As indicated above, FIGS. 1A-1C are provided as an example. Other examples may differ from what is described with regard to FIGS. 1A-1C. For example, although example 100 is described with two separate systems (e.g., the phone number ranking system and the call management system) performing distinct functions, techniques described herein may be performed by a single system.

Figure 2:
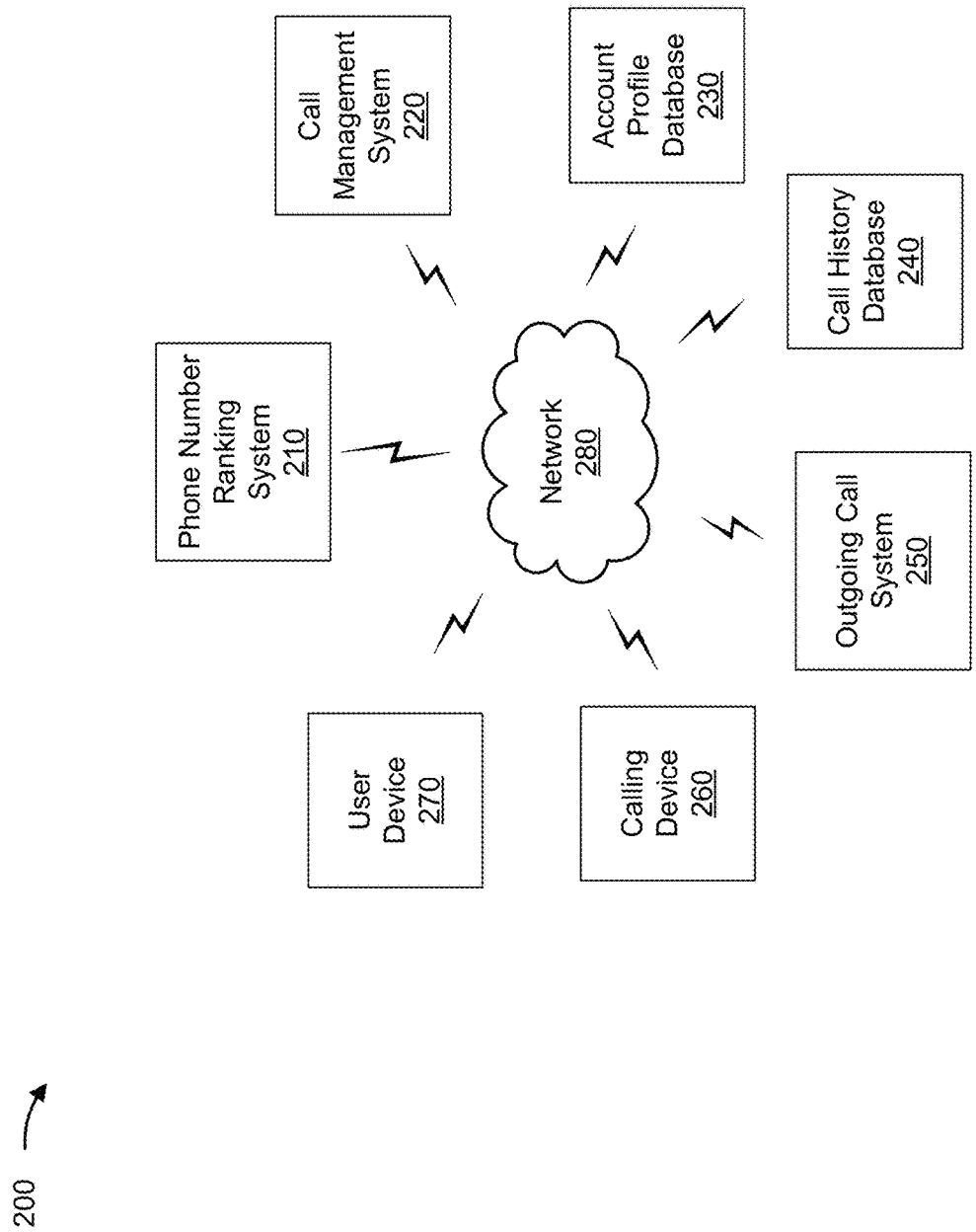
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a phone number ranking system 210, a call management system 220, an account profile database 230, a call history database 240, an outgoing call system 250, a calling device 260, a user device 270, and a network 280. Devices of environment 200 may interconnect via wired connections, wireless connections, or a combination of wired and wireless connections.

The phone number ranking system 210 includes one or more devices capable of receiving, generating, storing, processing, providing, and/or routing information associated with managing outbound calling, as described elsewhere herein. The phone number ranking system 210 may include a communication device and/or a computing device. For example, the phone number ranking system 210 may include a server, such as an application server, a client server, a web server, a database server, a host server, a proxy server, a virtual server (e.g., executing on computing hardware), or a server in a cloud computing system. In some implementations, the phone number ranking system 210 includes computing hardware used in a cloud computing environment.

The call management system 220 includes one or more devices capable of receiving, generating, storing, processing, providing, and/or routing information associated with managing outbound calling, as described elsewhere herein. The call management system 220 may include a communication device and/or a computing device. For example, the call management system 220 may include a server, such as an application server, a client server, a web server, a database server, a host server, a proxy server, a virtual server (e.g., executing on computing hardware), or a server in a cloud computing system. In some implementations, the call management system 220 includes computing hardware used in a cloud computing environment.

The account profile database 230 includes one or more devices capable of receiving, generating, storing, processing, and/or providing information associated with managing outbound calling, as described elsewhere herein. The account profile database 230 may include a communication device and/or a computing device. For example, the account profile database 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account profile database 230 may store information associated with one or more accounts associated with one or more users, such as account details, account statutes (e.g., delinquency statuses), user information (e.g., one or more user phone numbers, phone number types, and/or call windows), and/or call data (e.g., number of outgoing calls to a particular user phone number, number of incoming calls to a particular user phone number, and/or rate of right party contact) as described elsewhere herein.

The call history database 240 includes one or more devices capable of receiving, generating, storing, processing, and/or providing information associated with managing outbound calling, as described elsewhere herein. The call history database 240 may include a communication device and/or a computing device. For example, the call history database 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the call history database 240 may store information associated with one or more accounts associated with one or more users, such as dates and times of outgoing and inbound calls, phone numbers associated with the calls, and length of time of each call. The call history database 240 may be a part of the account profile database 230 and/or the call management system 220, or may be a separate component.

The outgoing call system 250 includes one or more devices capable of receiving, generating, storing, processing, providing, and/or routing information associated with managing outbound calling, as described elsewhere herein. The outgoing call system 250 may include a communication device and/or a computing device. For example, the outgoing call system 250 may include a server, such as an application server, a client server, a web server, a database server, a host server, a proxy server, a virtual server (e.g., executing on computing hardware), or a server in a cloud computing system. In some implementations, the outgoing call system 250 includes computing hardware used in a cloud computing environment.

The calling device 260 includes one or more devices capable of making a phone call (i.e., transmitting and receiving audio including a voice audio layer and a background audio layer), as described elsewhere herein. The calling device 260 also may be capable of receiving one or more notifications. The calling device 260 may include a communication device and/or a computing device. For example, the calling device 260 may include a wireless communication device, a phone, a mobile phone, a landline phone, a user equipment, a laptop computer, a tablet computer, a desktop computer, or a similar type of device. In some implementations, the calling device 260 may include multiple devices, such as a first device for engaging in a phone call and a second device for transmitting and/or receiving message. The calling device 260 may be a component of the outgoing call system 250 or may be connected to the outgoing call system 250.

The user device 270 includes one or more devices capable of receiving, generating, storing, processing, and/or providing information associated with managing outbound calling, as described elsewhere herein. The user device 270 may include a communication device and/or a computing device. For example, the user device 270 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 280 includes one or more wired and/or wireless networks. For example, the network 280 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 280 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
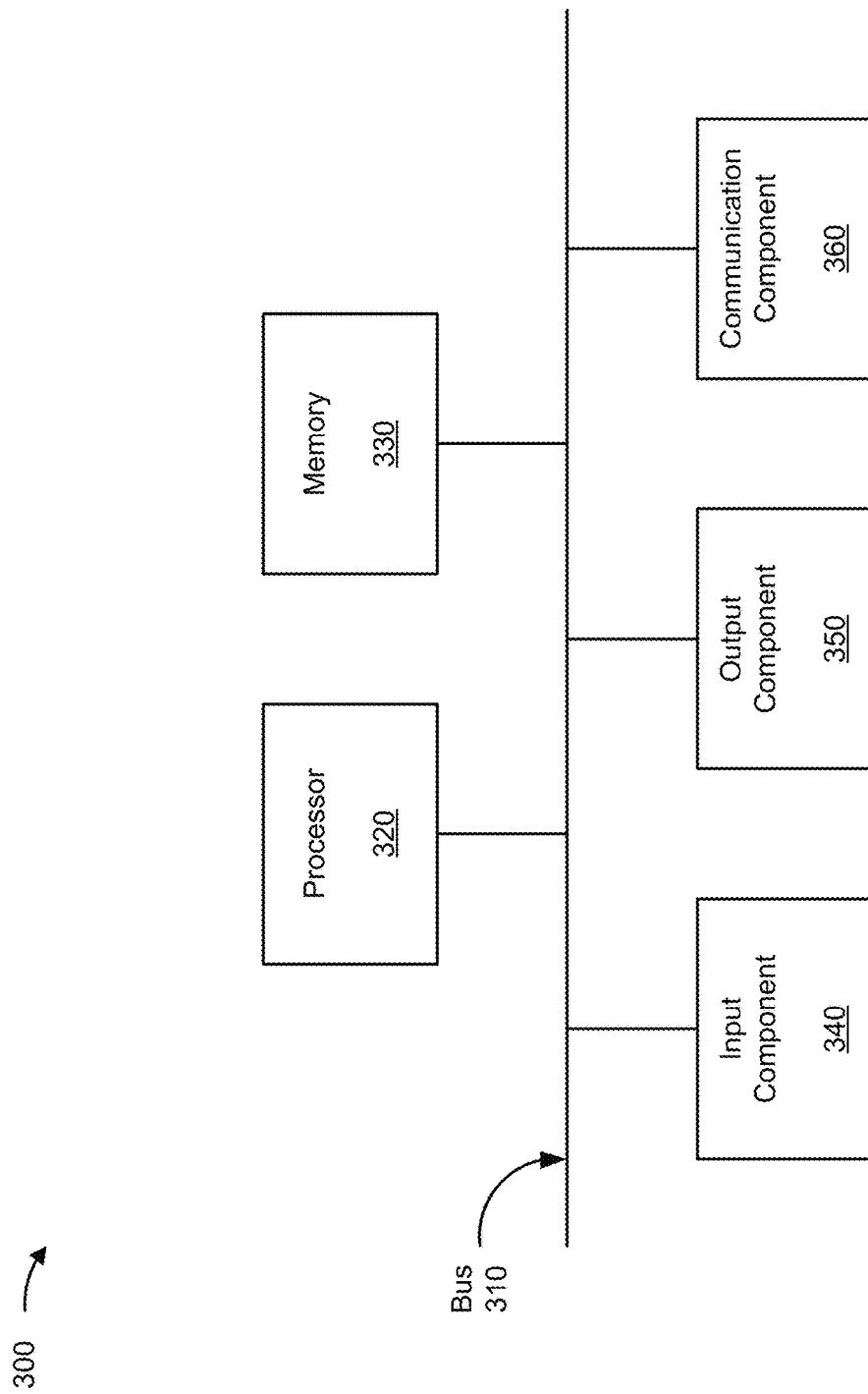
FIG. 3 is a diagram of example components of one or more devices of FIG. 2, in accordance with some embodiments of the present disclosure.

FIG. 3 is a diagram of example components of a device 300, which may correspond to phone number ranking system 210, call management system 220, account profile database 230, call history database 240, outgoing call system 250, calling device 260, and/or user device 270. In some implementations, phone number ranking system 210, call management system 220, account profile database 230, call history database 240, outgoing call system 250, calling device 260, and/or user device 270 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
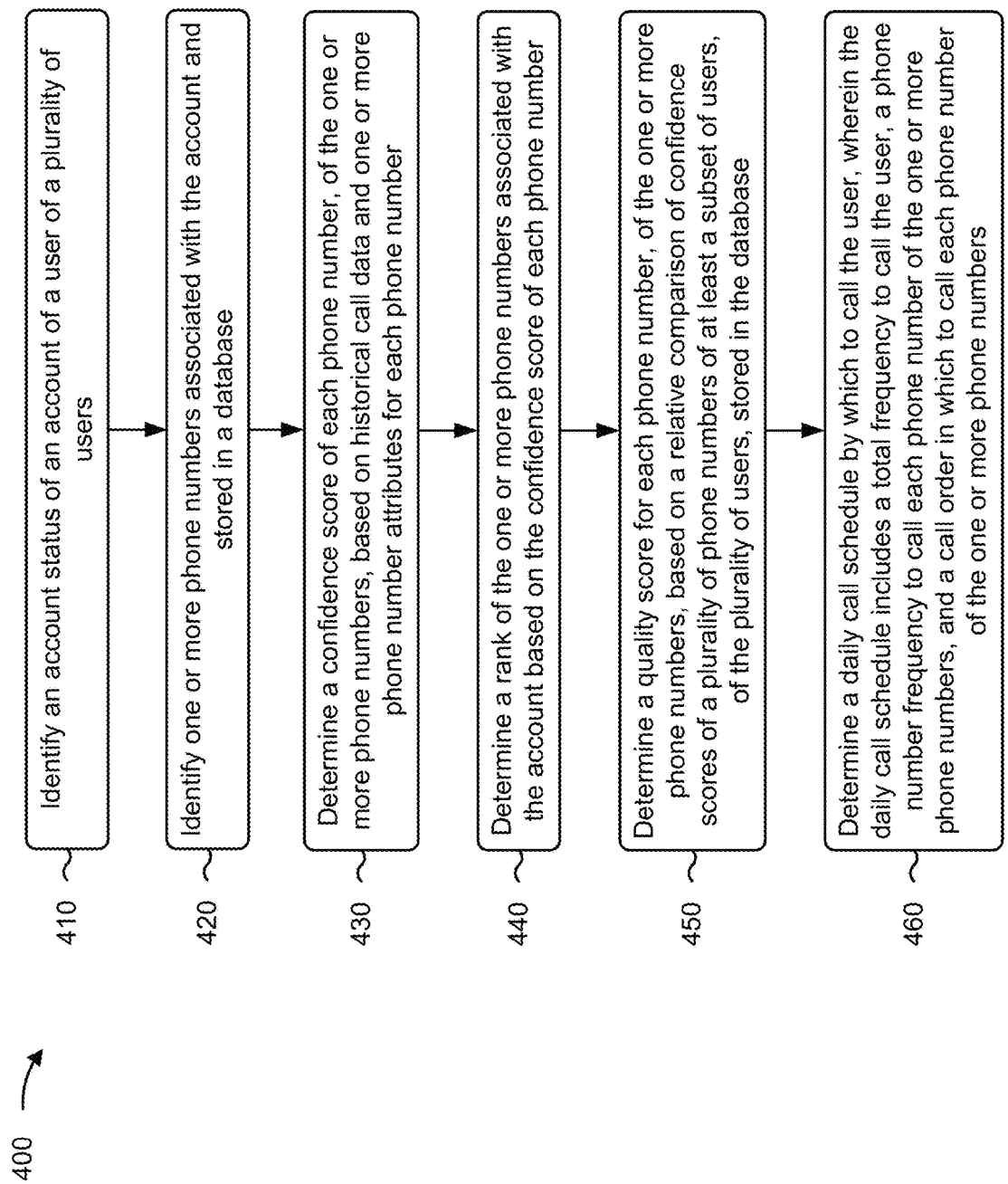
FIG. 4 is a flowchart of an example process relating to managing outbound calling, in accordance with some embodiments of the present disclosure.

FIG. 4 is a flowchart of an example process 400 associated with managing outbound calling. In some implementations, one or more process blocks of FIG. 4 may be performed by one or more systems (e.g., phone number ranking system 210 and/or call management system 220). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include identifying an account status of an account of a user of a plurality of users (block 410). As further shown in FIG. 4, process 400 may include identifying, based on the account status, one or more phone numbers associated with the account and stored in a database (block 420). As further shown in FIG. 4, process 400 may include determining a confidence score of each phone number, of the one or more phone numbers, based on historical call data and one or more phone number attributes for each phone number (block 430). As further shown in FIG. 4, process 400 may include determining a rank of the one or more phone numbers associated with the account based on the confidence score of each phone number (block 440). As further shown in FIG. 4, process 400 may include determining a quality score for each phone number, of the one or more phone numbers, based on a relative comparison of confidence scores of a plurality of phone numbers of at least a subset of users, of the plurality of users, stored in the database (block 450). As further shown in FIG. 4, process 400 may include determining a daily call schedule by which to call the user, wherein the daily call schedule includes a total frequency to call the user, a phone number frequency to call each phone number of the one or more phone numbers, and a call order in which to call each phone number of the one or more phone numbers, wherein the total frequency is based on the account status, wherein the phone number frequency is based on one or more conditions related to the quality score for each phone number of the one or more phone numbers, and wherein the call order is based on the rank of the one or more phone numbers (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 2-3. Moreover, while process 400 has been discussed in relation to the systems and components of the preceding figures, process 400 can be performed using alternative systems, additional components, or fewer components. Process 400 should not be limited to being performed with the example systems, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for managing outbound calling, the system comprising:
   one or more memories; and
   one or more processors, communicatively coupled to the one or more memories, configured to:
      identify an account status of an account of a user of a plurality of users;
      identify, based on the account status, one or more phone numbers associated with the account and stored in a database;
      determine a confidence score of each phone number, of the one or more phone numbers, based on historical call data and one or more phone number attributes for each phone number;
      determine a rank of the one or more phone numbers associated with the account based on the confidence score of each phone number;
      determine a quality score for each phone number, of the one or more phone numbers, based on a relative comparison of confidence scores of a plurality of phone numbers of at least a subset of users, of the plurality of users, stored in the database; and
      determine a daily call schedule by which to call the user, wherein the daily call schedule includes a total frequency to call the user, a phone number frequency to call each phone number of the one or more phone numbers, and a call order in which to call each phone number of the one or more phone numbers,
         wherein the total frequency is based on the account status,
         wherein the phone number frequency is based on one or more conditions related to the quality score for each phone number of the one or more phone numbers, and
         wherein the call order is based on the rank of the one or more phone numbers.

2. The system of claim 1, wherein, if the account has a first account status, then the total frequency is a first number, and
wherein if the account has a second account status, then the total frequency is a second number that is different from the first number.

3. The system of claim 1, wherein, if a quality score of a second ranked phone number, of the one or more phone numbers, is within a first threshold number of a quality score of a first ranked phone number, of the one or more phone numbers, and a quality score of a third ranked phone number, of the one or more phone numbers, is within a second threshold number of the quality score of the first ranked phone number, then at least one of:
   the call order is the first ranked phone number, the second ranked phone number, and the third ranked phone number, or
   the phone number frequency is the same for each of the first ranked phone number, the second ranked phone number, and the third ranked phone number.

4. The system of claim 1, wherein, if a quality score of a second ranked phone number, of the one or more phone numbers, is within a first threshold number of a quality score of a first ranked phone number, of the one or more phone numbers, and a quality score of a third ranked phone number, of the one or more phone numbers, is outside of a second threshold number of the quality score of the first ranked phone number, then at least one of:
   the call order is the first ranked phone number and the second ranked phone number, or
   the phone number frequency of the first ranked phone number is greater than the phone number frequency of the second ranked phone number.

5. The system of claim 1, wherein, if a quality score of a second ranked phone number, of the one or more phone numbers, is outside of a threshold number of a quality score of a first ranked phone number, of the one or more phone numbers, then the call order is the first ranked phone number, and the phone number frequency of the first ranked phone number is equal to the total frequency.

6. The system of claim 1, wherein the one or more processors are configured to use a supervised machine learning model to determine the confidence score for each phone number of the one or more phone numbers.

7. The system of claim 1, wherein the one or more phone number attributes include at least one of:
   a phone number type of a particular phone number of the one or more phone numbers; or
   a user type associated with the particular phone number.

8. The system of claim 1, wherein the historical call data for a particular phone number, of the one or more phone numbers, includes at least one of:
   a quantity of outgoing calls made to the particular phone number;
   a quantity of incoming calls received from the particular phone number; or
   a quantity of connected calls with the particular phone number that have a call duration that exceeds a duration threshold.

9. The system of claim 1, wherein, if the confidence score of each phone number, of the one or more phone numbers, is below a threshold value, then the one or more processors are configured to obtain at least one external phone number, from a third party server, that is associated with the user.

10. The system of claim 1, wherein the one or more processors are further configured to:
   determine if a particular phone number, of the one or more phone numbers, satisfies an auto-dial eligibility condition; and transmit data indicating the particular phone number to an auto-dial system if the particular phone number satisfies the auto-dial eligibility condition.

11. A method of managing outbound calling, comprising:
receiving, by a system, account data indicating one or more account phone numbers associated with an account of a user;
storing, by the system and in a database, call data associated with each account phone number of the one or more account phone numbers;
determining, by the system, a priority of the one or more account phone numbers based on a machine learning model, wherein the machine learning model is trained using the call data;
determining, by the system, one or more selected phone numbers, of the one or more account phone numbers, to be called based on a relative comparison of the one or more account phone numbers, arranged in a ranked order based on the priority, with another one of the one or more account phone numbers;
determining, by the system, a call schedule by which to call each selected phone number, of the one or more account phone numbers, wherein the call schedule includes a frequency to call each selected phone number; and
transmitting, by the system and to an outgoing call system, call schedule data indicating the call schedule.

12. The method of claim 11, wherein determining the priority of the one or more account phone numbers comprises:
determining, via the machine learning model, a confidence score for each phone number of the one or more account phone numbers,
wherein the priority is a rank of the one or more account phone numbers in an order of decreasing confidence score.

13. The method of claim 12, wherein determining the one or more selected phone numbers comprises:
determining a first ranked account phone number, of the one or more account phone numbers and arranged first in the ranked order, to be a selected phone number if the confidence score of the first ranked account phone number satisfies a confidence score threshold.

14. The method of claim 13, wherein determining the one or more selected phone numbers further comprises:
determining a respective quality score for each account phone number of the one or more account phone numbers; and
comparing a quality score of a particular account phone number, of the one or more account phone numbers, with a quality score of the first ranked account phone number,
wherein the particular account phone number is determined to be another selected phone number if the quality score of the particular account phone number is within a threshold value of the quality score of the first ranked account phone number.

15. The method of claim 14, wherein determining the respective quality score for each account phone number comprises:
arranging a plurality of account phone numbers, associated with a plurality of accounts corresponding to a plurality of users, in an overall order of decreasing confidence score; and
dividing the plurality of account phone numbers, arranged in the overall order, into groups, wherein each group represents a percentile of the plurality of account phone numbers,
wherein the quality score for the particular account phone number is based on the percentile in which the particular account phone number is grouped.

16. A non-transitory computer-readable medium storing a set of instructions for managing outbound calling, the set of instructions comprising:
one or more instructions that, when executed by one or more processors of a device, cause the device to:
identify one or more account phone numbers associated with an account of a user, of a plurality of users, stored in a database;
determine a confidence score of each account phone number, of the one or more account phone numbers, based on historical call data and one or more phone number attributes for each account phone number;
determine a ranked order of the one or more account phone numbers based on the confidence score of each account phone number;
determine one or more selected phone numbers, of the one or more account phone numbers, to be called based on a relative comparison of the one or more account phone numbers, arranged in the ranked order, with another one of the one or more account phone numbers; and
determine a daily call schedule by which to call the user, wherein the daily call schedule includes a total frequency to call the user, a phone number frequency to call each selected phone number of the one or more selected phone numbers, and a call order in which to call each selected phone number of the one or more selected phone numbers.

17. The non-transitory computer-readable medium of claim 16, wherein the account has an account status, and wherein the one or more instructions further cause the device to:
determine the total frequency to call the user based on the account status.

18. The non-transitory computer-readable medium of claim 16, wherein the one or more instructions further cause the device to:
determine a quality score for each account phone number of the one or more account phone numbers,
wherein the quality score is based on a comparison of confidence scores of a plurality of account phone numbers of at least a subset of users, of the plurality of users, stored in the database, and
wherein the phone number frequency is based on one or more conditions related to the quality score for each account phone number of the one or more account phone numbers.

19. The non-transitory computer-readable medium of claim 16, wherein the one or more phone number attributes include at least one of:
a phone number type of a particular account phone number of the one or more account phone numbers; or
a user type associated with the particular account phone number.

20. The non-transitory computer-readable medium of claim 16, wherein the historical call data for a particular account phone number, of the one or more account phone numbers, includes at least one of:
a quantity of outgoing calls made to the particular account phone number;

a quantity of incoming calls received from the particular account phone number; or a quantity of connected calls with the particular account phone number that have a call duration that exceeds a duration threshold.

\* \* \* \* \*